Dec. 18, 1951    W. H. NORDENSON ET AL    2,579,394
LINKED CONNECTOR AND METHOD OF MAKING SAME
Filed May 21, 1948

INVENTORS
W. H. NORDENSON
W. W. McCAW
BY
ATTORNEYS

Patented Dec. 18, 1951

2,579,394

UNITED STATES PATENT OFFICE 2,579,394

LINKED CONNECTOR AND METHOD OF MAKING SAME

Willard H. Nordenson and Warren W. McCaw, Dubuque, Iowa, assignors to Deere Manufacturing Co., Dubuque, Iowa, a corporation of Iowa Application May 21, 1948, Serial No. 28,484

8 Claims. (Cl. 59—35)

This invention relates to a link or articulate connecting element and to the method for making same. More particularly, the invention relates to such link element which is assembled in such manner that the component parts cannot accidentally become separated from each other.

A connecting element provided according to the present invention finds its greatest usefulness in hitching devices for agricultural tractors and implements and is especially adapted to this field because the inseparability of the component parts provides a connector that is easily used in effecting the numerous connections and disconnections involved in using a tractor with several implements, it being appreciated in this respect that a desirable connecter is one that may be easily and quickly disconnected under varying conditions and without the likelihood of any loss of parts.

The invention is of particular utility in connection with a tractor of the type shown in assignee's copending application, Serial No. 700,055, filed September 28, 1946, now Patent No. 2,503,096 granted April 4, 1950, by Bernard E. Carlson, wherein the tractor is equipped with a drawbar that may be vertically adjusted by means of a power actuated arm, whereby the height of the carrying portion of the drawbar may accommodate a wide variety of implements. The present invention provides an improvement in the connection between the drawbar and the power arm whereby the vertical adjustability of the drawbar is effected. Such drawbar is provided with means for positively locking it in any selected position of adjustment and in several cases the connecting elements or chains between the drawbar and power arm are removed so that the power arm may be used for the control of implements connected to the tractor. In situations involving the disconnecting of the connecting element between the drawbar and power arm, there is considerable likelihood that the components of such connection will be lost in the field. According to the present invention, it is an important object to provide a connecting element in which the components are not accidentally separable. It is likewise an important object to provide an improved and simple method of producing such connecting element, whereby a large stock of the associated components may be produced in quantities, readily assembled, and then formed so that the components cannot become separated. It is an object of the invention to provide an improved connecting element which may be used in place of a conventional chain and which is considerably stronger and cheaper than such chain. It is a further object of the invention to provide a connecting element in which opposite end portions provide suitable clevises so that connection and disconnection may be easily effected between the connecting element and associated parts.

The foregoing and other important objects and features of the invention will become apparent to those skilled in the art as the disclosure of a preferred form of the invention is more fully made in the following detailed description and accompanying sheet of drawings in which Figure 1 is a perspective view of a rear portion of a tractor provided with drawbar structure of the type referred to above and including connecting elements constructed according to the invention;

The particular adaptation of the invention chosen for the purposes of illustration is merely representative of one of the several instances in which the invention could be used. Therefore, only brief and general reference will be had to the tractor structure. It will be appreciated in this respect that the preferred form of the invention illustrated is capable of variations in design and proportion to suit the application thereof to other operational conditions, all without departing from the spirit and scope of the invention as defined in the claims appended hereto.

Figure 1:
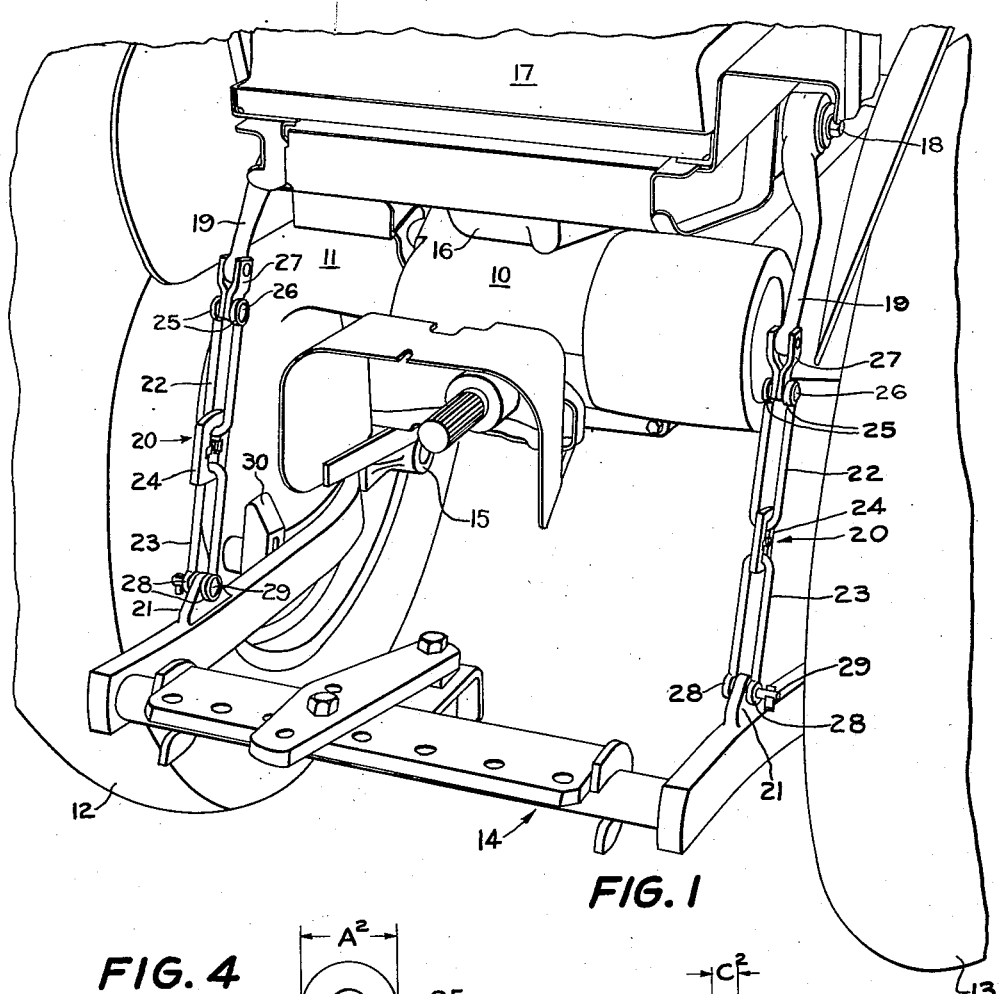

The rear portion of the tractor illustrated is shown as having a main body portion 10 which includes transverse rear axle structure 11 carried on traction wheels 12 and 13, the construction in this respect being largely conventional. The tractor has a rearwardly extending drawbar 14 which extends forwardly beneath the transverse axle structure 11 and which is pivoted to the axle structure on a transverse horizontal pivot axis by a pair of trunnions, one of which is visible at 15 in Figure 1. The drawbar 14 is thus carried on the tractor for vertical swinging adjustment about the transverse axis through the trunnion 15. The tractor illustrated is of the type including an integral power lift of power control mechanism, a portion of the housing of which is indicated at 16 just below an operator's seat 17 (Figure 1). The power lift mechanism forms no part of the present invention and therefore will be only briefly and generally referred to.

The power lift mechanism is of the type having a transverse rockshaft, one end of which is visible at 18 in Figure 1 and on each end of which is carried a power control arm 19, it being understood that rocking of the rockshaft 18 effects vertical swinging movement of the arms 19. The power control arms are utilized for adjusting the drawbar 14 vertically, and for this purpose each arm is connected to the drawbar by means of a connecting element indicated generally by the numeral 20, each side of the drawbar having an apertured ear 21 for this purpose.

In the following description of the connecting element, only one will be described, since the two are identical.

Each connecting element comprises a pair of similar U-shaped members 22 and 23 articulately interconnected by a link 24. The terminal end of each leg of the U that forms the member 22 is enlarged and pierced to provide an eye 25 to form a clevis for receiving a connecting pin 26 which is passed through a connecting link 27 pivoted to the associated power arm 19. The other U-shaped member 23 is similarly formed with eyes 28 for the purpose of receiving a connecting pin 29 which passes through the apertured ear 21 on the proximate side of the drawbar 14.

In the use of a tractor of the type illustrated, it is common to utilize the connecting element 20 as means for interconnecting the drawbar and power arms 19 for adjusting the height of the drawbar and then disconnecting the element 20 so that the arms 19 may be utilized with other connecting elements for adjusting an implement connected to the tractor, it being understood that the drawbar is at such times fixed in a selected position by locking means of the type disclosed in the co-pending application referred to, a representation of which appears at 30 in Figure 1 at one side of the drawbar. Inasmuch as the connecting elements 20 may be disconnected, it is found that they often have no immediate use and, heretofore, in the case of different types of connecting elements it was found that various components became lost in the field, which loss was not only a source of annoyance inasmuch as the parts had to be replaced but the lost parts were apt to be picked up by the mechanism of an implement or machine subsequently operated over the field.

Figure 4:
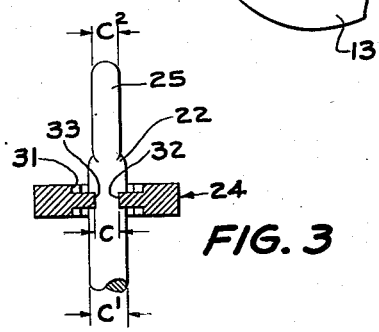
Figure 4 is a longitudinal sectional view of the link, the section being taken substantially along the line 4—4 of Figure 2.
Figure 3:
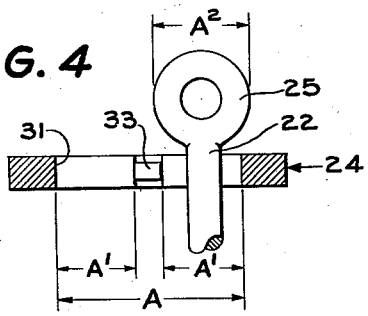
Figure 3 is a transverse sectional view through the link shown in Figure 2, the view being taken substantially along the line 3—3 of Figure 2.
Figure 2:
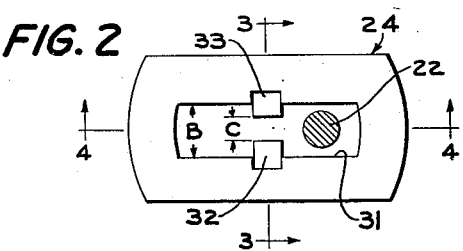
Figure 2 is a face view of the central link element of one of the connecters, shown in relation to a section or portion of an associated connecting member.

Figures 2, 3 and 4 illustrate the construction of the link member 24 and the relationship thereof to the members 22 and 23, and in these figures it will be seen that the invention provides for the ready assembly of the components but precludes the separation thereof after assembly.

Figure 3 shows that the link 24 is preferably of one-piece construction and has generally the shape of an O and is provided with an opening preferably in the form of an elongated slot 31. This piece is preferably constructed from a piece of flat stock and the slot 31 is provided by a piercing or punching operation. The piece thus lends itself readily to production in quantities. Although only a portion of one of the U-shaped members is shown in each of Figures 2, 3 and 4, the general construction thereof can be readily appreciated. It will be seen that each member includes a bight portion which is loosely received by the end of the slot 31 in the connecting link 24, with the member 22 (23) so disposed that the legs of the member extend away from the link, as in Figure 1. The members 22 and 23, being identical, may also be produced in quantities and as completed pieces, meaning that the terminal ends of the legs may be enlarged to provide the eyes 25 (28) prior to assembly of the members with the link 24.

The completed link 24 is shown in the drawing as having a pair of laterally extending projections 32 and 33 which extend across the slot 31 to divide the slot 31 substantially into two smaller slots or openings, each of which is large enough to loosely receive the bight or intermediate portion of its associated member but each of which is small enough to prevent passage of an eye portion 25 (28) therethrough.

The following description of the method of assembling the links and members will indicate the detailed structure of the parts and the manner in which assembly is accomplished and disassembly is prevented.

As stated above, the links 24 are produced in quantities in a preliminary operation which forms the links and provides the slots 31 therein. A quantity of the U-shaped members 22 (23) is similarly produced, each member being in completed form and already having both of its eye portions provided thereon. The U-shaped members may be produced in any conventional manner, such as using round bar stock, bending the same to U-shape formation either before or after the ends thereof are upset or flattened and pierced to provide the eyes.

Each connecting element 20 may then be readily assembled by taking a link 24 and a pair of U-shaped members and passing an eye portion of each of the latter through the slots 31 so that the bight portions of the U-shaped members are loosely received respectively at opposite ends of the slot. With the parts assembled in this fashion, the next step is the operation that forms the projections 32 and 33. Such operation may be of any nature that displaces a portion of the link (or two portions) laterally across the slot to divide the slot into the two smaller slots, as mentioned above. In a preferred method, the portions 32 and 33 are provided by a staking operation in which integral portions of the link at opposite sides of the link are displaced inwardly toward each other to provide a barrier across the slot and intermediate the end thereof. The projections 32 and 33 could be extended completely across the slot so as to meet at the longitudinal median plane of the slot, although it is necessary only that the spacing between the inner ends of the projections be less than the thickness of the eye of the member 22 (23).

The original dimension of the length of the slot 31 is indicated at A in Figure 4. The longest dimension of each of the smaller slots provided by the barrier established by the projections 32 and 33 is indicated at $A^1$. The greatest dimension or outside diameter of the enlarged or eye portion 25 of the member 22 is indicated at $A^2$. It will be immediately noted that the dimension $A^2$ is greater than the dimension $A^1$; however, the dimension $A^2$ is considerably less than the dimension A.

The space between the proximate ends of the projections 32 and 33 is indicated by the dimension C in Figure 3. This dimension is considerably less than the transverse dimension B of the slot 31 (Figure 2) and is also less than the dimension $C^1$, which is the dimension of the stock from which the U-shaped member is formed, it being noted that in this case the bight portion of the U-shaped member is substantially uniformly dimensioned between the eyes 25. The dimension C is also less than the dimension $C^2$, which represents the thickness of the eyes 25. In a preferred construction, the dimension A is equal to the dimension $A^2$ plus an allowance of at least the dimension $C^1$, so that after the member 22 is passed through the slot 31, there will be room for passage of the eye on the other member 23 through the slot.

After these members are assembled with respect to the link, by passing the eye portion of the former through the latter so that the members are retained temporarily by the bight portion thereof, the barrier elements or projections 32 and 33 are formed. Each of the smaller slots thus provided has the dimensions $A^1$ and B. Since each of these dimensions (and a diagonal across the corners thereof) is less than the dimension $A^2$, the members 22 or 23 cannot become separated from the link 24, it being remembered that the dimension C between the projections 32 and 33 is less than the dimension $C^2$ of the eye.

It will be seen from the foregoing that the assembled product is very easily made from a plurality of components that are preformed and that the only final forming operation required is the step of producing the means for barring (at least) the slot 31 intermediate its ends to confine the members 22 and 23 against escape therefrom. Consequently, the connecting element may be produced more economically than a conventional chain of equal size and strength. Besides, the connecting elements provided here have the advantage of including the clevises provided by the eyes 25 and 28, a characteristic not found in the ordinary chain.

What is claimed is:

1. A linked connecting element, comprising: a one-piece link shaped generally as an O and having an elongated slot therethrough; a U-shaped member articulately connected with the link and having a bight and a pair of legs, the bight being substantially uniformly dimensioned so as to pass loosely through the link slot and the terminal end of each leg being enlarged to provide an eye portion having an outside diameter less than the length but greater than the width of the link slot and a thickness less than the width of the link slot so that the link and member may be assembled by passing one of the eye portions through the link slot; and means on the link including an integral portion thereof displaced laterally from at least one side thereof in a direction across the slot, after assembly of the link and member, to reduce the length of that portion of the slot through which the member passes to a dimension less than the outside diameter of the eye portion.

2. A linked connecting element, comprising: a one-piece link shaped generally as an O and having an elongated slot therethrough; a U-shaped member articulately connected with the link and having a bight and a pair of legs, the bight being substantially uniformly dimensioned so as to pass loosely through the link slot and the terminal end of each leg being enlarged to provide an eye portion having an outside diameter less than the length but greater than the width of the link slot and a thickness less than the width of the link slot so that the link and member may be assembled by passing one of the eye portions through the link slot; and means on the link including integral portions thereof displaced laterally from opposite sides thereof and toward each other across the slot, after assembly of the link and member, to reduce the length of that portion of the slot through which the member passes to a dimension less than the outside diameter of the eye portion.

3. A linked connecting element, comprising: a pair of similar U-shaped members and a one-piece continuous link articulately interconnecting said members; each of said members having a bight and a pair of legs, the bight being of substantially uniform thickness and the terminal end of each leg including an integral enlargement providing an eye portion; the link being generally of O shape and having an elongated slot therethrough of a length greater than the outside diameter of an eye portion of one member plus the thickness of the bight of the other member and of a width greater than the thickness of an eye portion and sufficient to loosely receive the bight of each member, so that the members and link may be assembled by passing the eye portions of the members through the link slot; and means on the link including an integral portion thereof displaced laterally from at least one side thereof in a direction across the slot intermediate the ends thereof, after assembly of the link and members, to divide the slot substantially into two smaller slots the length of each of which is less than the outside diameter of either eye portion of the associated member.

4. A linked connecting element, comprising: a pair of similar U-shaped members and a one-piece continuous link articulately interconnecting said members; each of said members having a bight and a pair of legs, the bight being of substantially uniform thickness and the terminal end of each leg including an integral enlargement providing an eye portion; the link being generally of O shape and having an elongated slot therethrough of a length greater than the outside diameter of an eye portion of one member plus the thickness of the bight of the other member and of a width greater than the thickness of an eye portion and sufficient to loosely receive the bight of each member, so that the members and link may be assembled by passing the eye portions of the members through the link slot; and means extending at least partially across the smaller dimension of the slot after assembly of the link and members to at least partially close the slot intermediate its ends and thus to substantially divide the slot into two smaller slots the length of each of which is less than the outside diameter of either eye portion of the associated member.

5. The method of making a linked connecting element, comprising: forming a one-piece link generally as an O having an elongated slot therethrough and an associated U-shaped member having a bight and a pair of legs wherein the bight is substantially uniformly dimensioned to pass loosely through the slot and the terminal end of each leg has an enlarged eye portion having an outside diameter less than the length of the slot but greater than the width of the slot; assembling the link and member by passing an eye portion through the slot so that the link loosely receives the bight; and then displacing an integral portion of the link in a direction across the slot to reduce the length of that portion of the slot through which the member passes to a dimension less than the outside diameter of the eye portion.

6. The method of making a linked connecting element, comprising: forming a one-piece link generally as an O having an elongated slot therethrough and an associated U-shaped member having a bight and a pair of legs wherein the bight is substantially uniformly dimensioned to pass loosely through the slot and the terminal end of each leg has an enlarged eye portion having an outside diameter less than the length of the slot but greater than the width of the slot; assembling the link and member by passing an eye portion through the slot so that the link loosely receives the bight; and then displacing integral portions of the link from opposite sides thereof across the slot and toward each other to reduce the length of that portion of the slot through which the member passes to a dimension less than the outside diameter of the eye portion.

7. The method of making a linked connecting element, comprising: forming a pair of similar U-shaped members and a one-piece continuous link so that each member has a bight and a pair of legs, the bight being of substantially uniform thickness and the terminal end of each leg including an integral enlargement providing an eye portion and so that the link is generally of O shape and having an elongated slot therethrough of a length greater than the outside diameter of an eye portion of one member plus the thickness of the bight of the other member and of a width greater than the thickness of an eye portion and sufficient to loosely receive the bight of each member; assembling the link and members by passing an eye portion of each member through the slot so that the link loosely receives the bights of the members at opposite ends of the slot; and then displacing an integral portion of the link from at least one side thereof laterally across the slot intermediate the ends thereof to divide the slot substantially into two smaller slots the length of each of which is less than the outside diameter of either eye portion of the associated member.

8. The method of making a linked connecting element, comprising: forming a pair of similar U-shaped members and a one-piece continuous link so that each member has a bight and a pair of legs, the bight being of substantially uniform thickness and the terminal end of each leg including an integral enlargement providing an eye portion and so that the link is generally of O shape and having an elongated slot therethrough of a length greater than the outside diameter of an eye portion of one member plus the thickness of the bight of the other member and of a width greater than the thickness of an eye portion and sufficient to loosely receive the bight of each member; assembling the link and members by passing an eye portion of each member through the slot so that the link loosely receives the bights of the members at opposite ends of the slot; and then at least partially closing the slot intermediate the ends thereof and across its smaller dimension to substantially divide the slot into two smaller slots the length of each of which is less than the outside diameter of either eye portion of the associated member.

WILLARD H. NORDENSON.
WARREN W. McCAW.

REFERENCES CITED

The following references are of record in the file of this patent:

UNITED STATES PATENTS

| Number | Name | Date |
| --- | --- | --- |
| 271,141 | Simons et al. | Jan. 23, 1883 |
| 618,086 | Haase | Jan. 24, 1899 |
| 682,361 | Keith | Sept. 10, 1901 |
| 1,079,476 | Deakins | Nov. 25, 1913 |
| 1,273,689 | Thomas | July 23, 1918 |
| 1,576,424 | Goodman | Mar. 9, 1926 |